March 18, 1969 G. W. PAINTER ET AL 3,434,060
DAMPED SHOCK SPECTRUM FILTER
Filed Oct. 14, 1964 Sheet 1 of 5
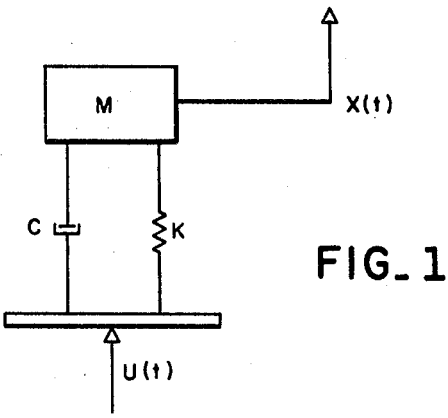
FIG_1
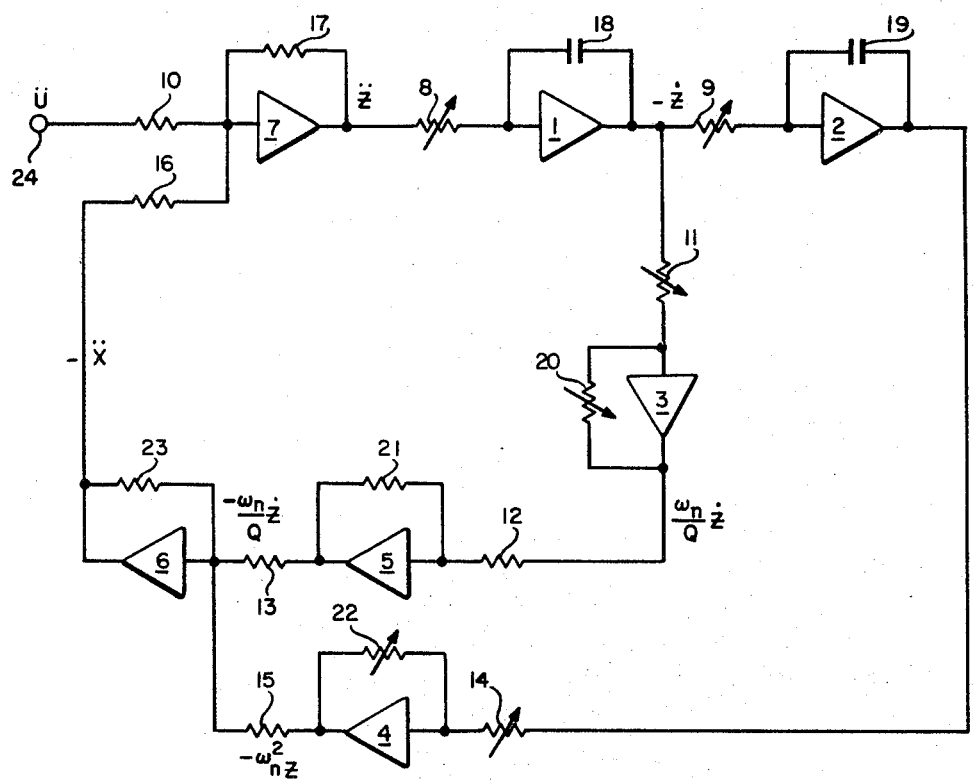
FIG_2
INVENTORS
GILES W. PAINTER
HUGH J. PARRY
By George A. Sullivan
Agent

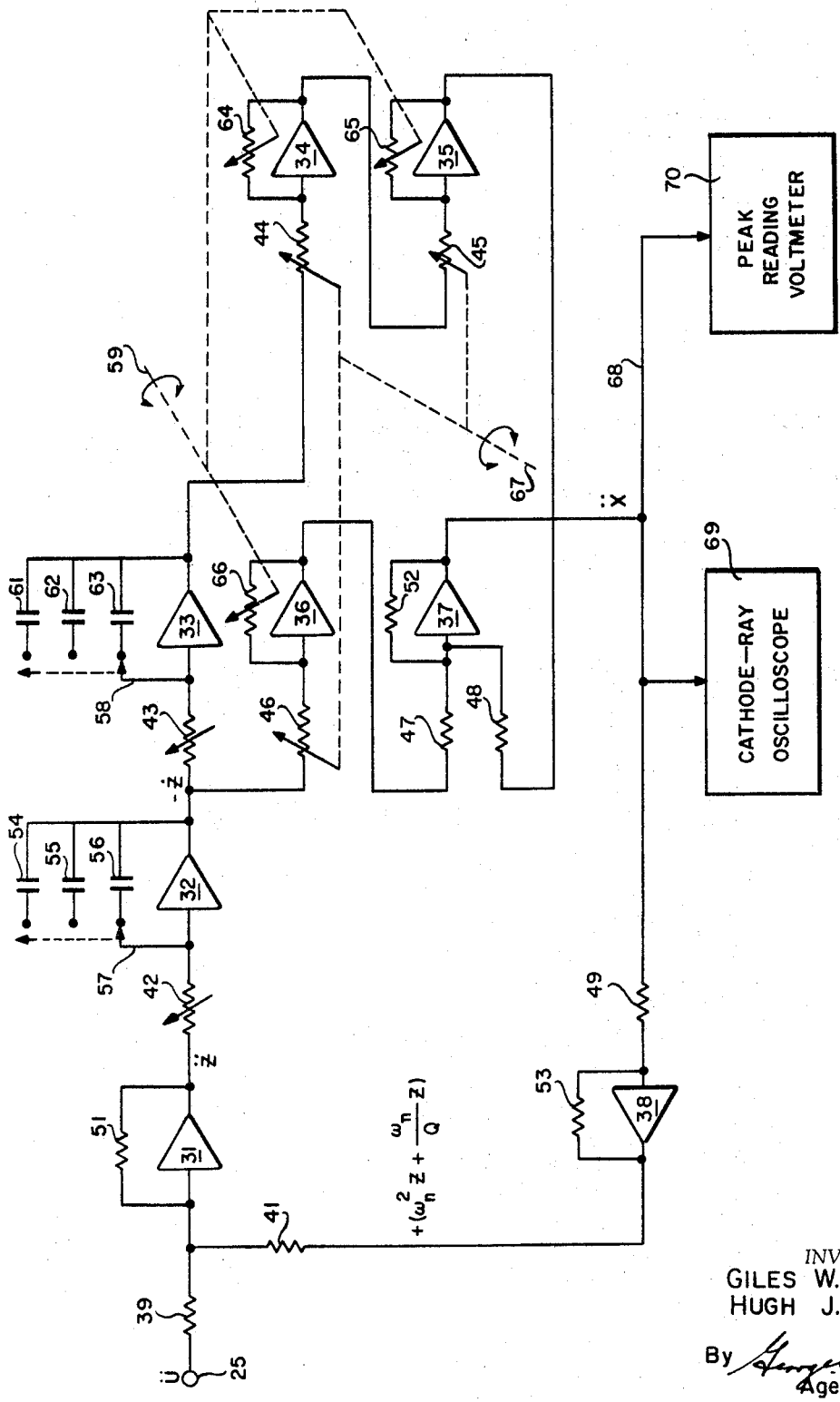
FIG_3

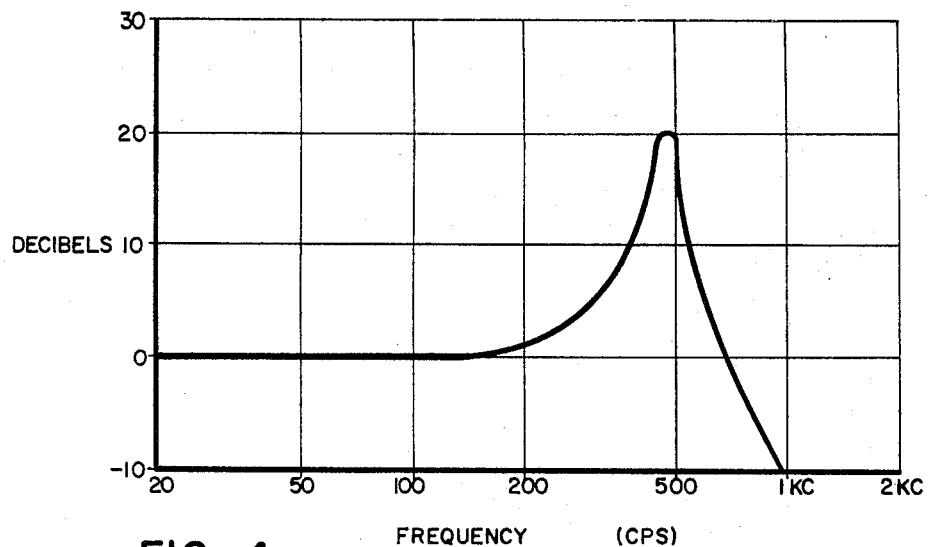
FIG_4
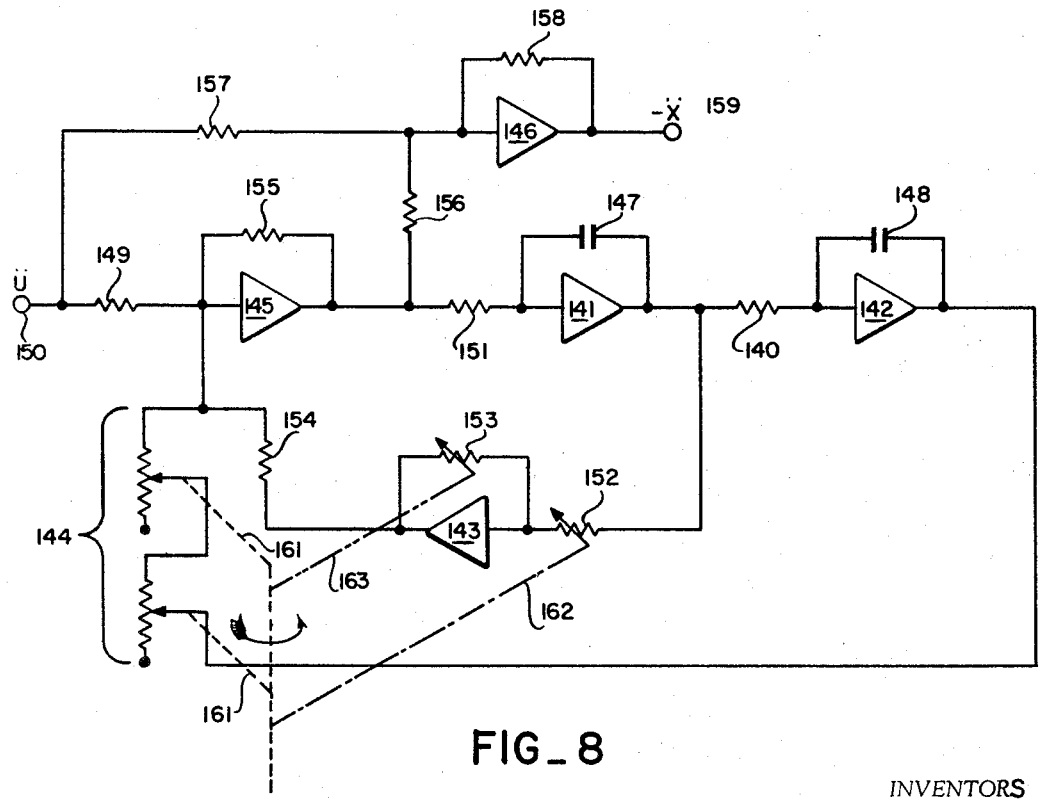
FIG_8

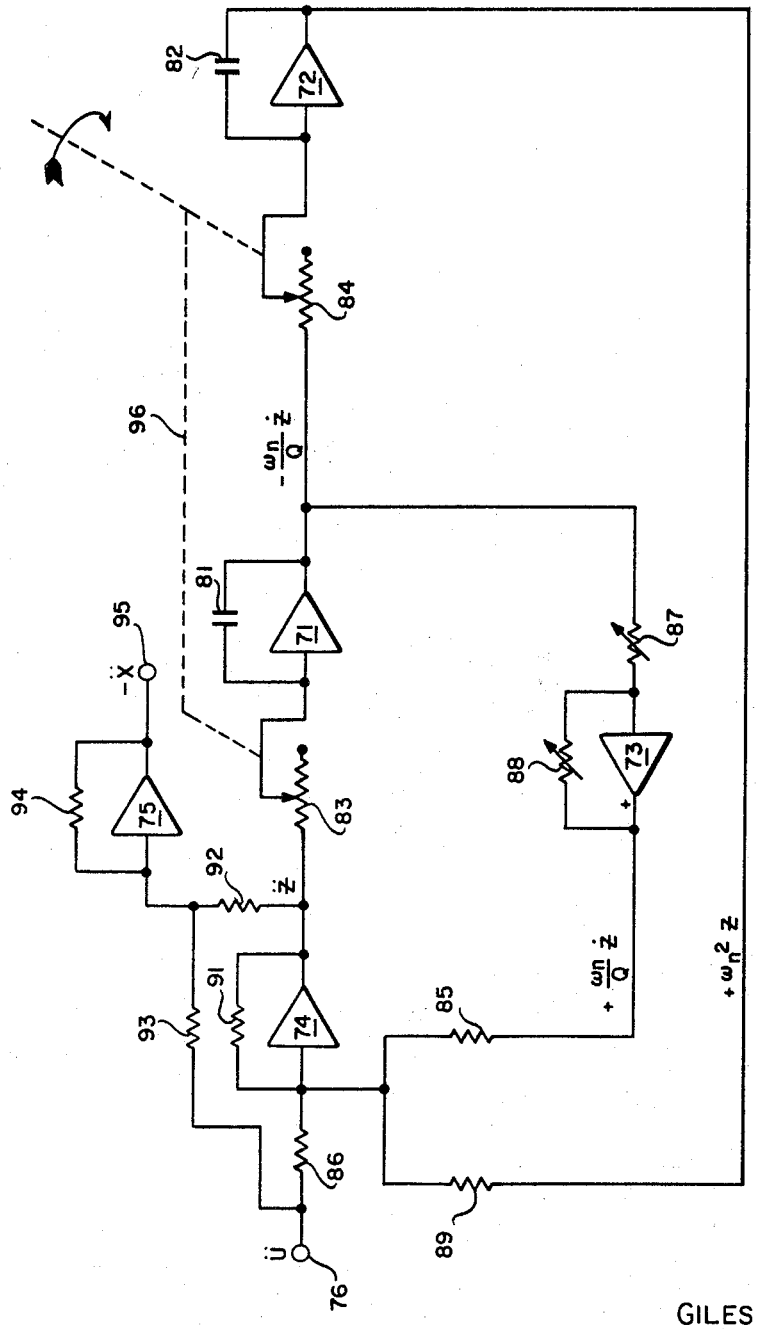
FIG_5

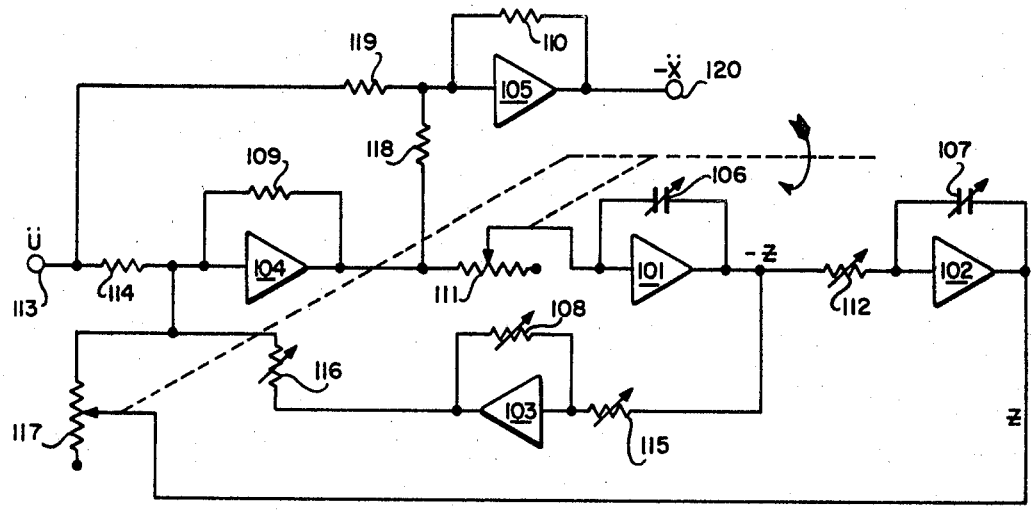
FIG_6
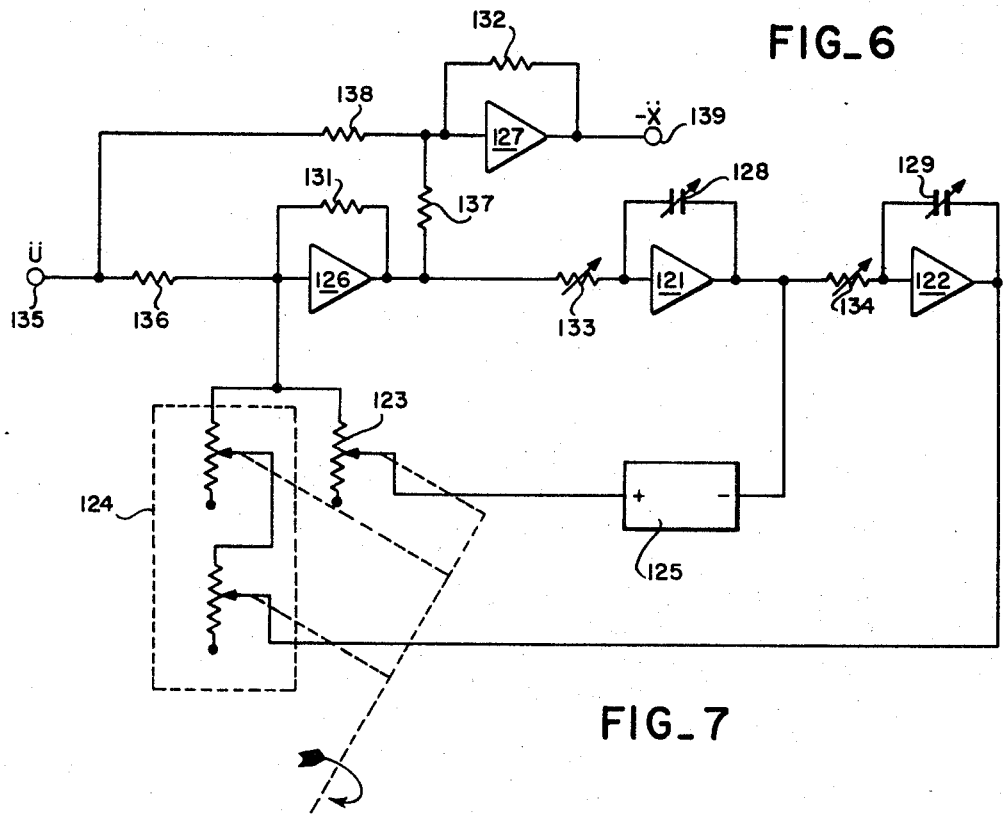
FIG_7

United States Patent Office 3,434,060
Patented Mar. 18, 1969

3,434,060
DAMPED SHOCK SPECTRUM FILTER
Giles W. Painter, Granada Hills, and Hugh J. Parry, North Hollywood, Calif., assignors to Lockheed Aircraft Corporation, Burbank, Calif.
Filed Oct. 14, 1964, Ser. No. 403,818
U.S. Cl. 328—127                                                    17 Claims
Int. Cl. G06g 7/18

ABSTRACT OF THE DISCLOSURE

An electrical network is described which simulates a second-order, base-excited vibration system. Various input accelerations may be applied to the input and a continuous frequency analysis made of the response acceleration. Simulation of a damped single-degree-of-freedom vibration system is achieved by varying the spring force as a function of the damping force to maintain a fixed ratio therebetween.

---

This invention relates to electrical filter apparatus, and more particularly to a novel and improved shock spectrum filter which maintains a constant selected Q over a continuous frequency band.

Useful applications of continuous-frequency, constant-Q, filters are many, one of which is in obtaining continuous frequency analyses of complex transients. For example, such analyses are particularly useful in measuring shock spectra associated with earth tremors or with shock transients occurring in aerospace vehicles. The control of Q, the dissipative factor, in filters used for spectrum analysis has been a considerable problem in transient spectra measurement. Since previous continuous-frequency filters have a constant bandwidth, they have a Q that varies directly with the frequency.

Continuous frequency filters having a constant bandwidth (not constant Q) are well known to those versed in the art. A common method of obtaining constant bandwidth filtering employs a heterodyne system in conjunction with a band-pass type filter. While this provides a constant bandwidth, it is the anti-thesis of a constant Q and therefore the change of Q with changes in frequency requires that correction factors be applied. Furthermore, a bandpass type system filter provides a transfer function which is not analogous to that of a damped single degree of freedom vibration system and consequently is not suitable for shock spectrum analysis.

The constant Q filter of the present invention maintains a constant proportionality between bandwidth and center frequency while the center frequency is continuously varied. Of the several methods which have been employed, heretofore, in an effort to simplify performing this function, most have been extremely complex in circuitry, or a compromise of the desired characteristics.

The present invention uses a novel arrangement of analog computer components to provide a second order, continuous-frequency, constant-Q filter. By arrangement of analog computer components with ganged controls, affecting two, or in some cases three, operational amplifiers, a simplification in adjustment of the equivalent circuit is provided. Although the same component arrangement, without the ganged controls, could be used, adjustment of the several gain controls in the system would be required with each change in frequency. In accordance with the invention, either the feedback potentiometers or the input potentiometers may be ganged and thereby maintain the time constant in the integration circuits at a fixed value. This feature maintains the Q of the filter at a constant value, while varying bandwidth with frequency. The addition of ganged potentiometers will permit measurements to be made more quickly and without the necessity of frequent readjustment of individual potentiometers or the necessity of applying correction factors. If desired, a drive motor may be coupled to the ganged potentiometer shafts, and driven in synchronism with a frequency sweep, thus making an automatic X–Y plot of magnitude vs. frequency feasible.

It is therefore a principal object of the invention to provide a continuous-frequency filter having a proportional bandwidth and a constant Q over the frequency range of interest.

Another object of the invention is to provide a constant Q filter which maintains a constant proportionality between bandwidth and center frequency while the center frequency is continuously varied.

Still another object of the invention is to provide a continuous-frequency, constant Q, second order electrical filter which is particularly useful in measuring spectra of complex waveforms.

It is another object of the invention to provide novel and improved apparatus for the measurement of shock transient spectra.

Yet another object of the invention is to provide novel and improved methods and apparatus for spectral measurement.

A general object of this invention is to provide a novel and improved electrical filter apparatus which overcomes disadvantages of previous means and methods heretofore intended to accomplish generally similar purposes.

The features of this invention which are believed to be novel are set forth with particularity in the appended claims. The invention itself, both as to its organization and method of operation, together with further objects and advantages thereof may be best understood by reference to the following description taken in connection with the accompanying drawings, in which:

FIGURE 1 is a schematic diagram of a base-excited, second order vibration system, which diagram is of assistance in the exposition of the invention.

FIGURE 2 is a schematic diagram of a typical analog computer network for simulating the second order base-excited system of FIGURE 1.

FIGURE 3 is a schematic diagram of one of the novel arrangements of analog computing elements which comprises the filter of the invention.

FIGURE 4 is a chart graphically representing the forward transfer function of a filter constructed in accordance with the invention.

FIGURE 5 is a schematic diagram of another embodiment of a filter constructed in accordance with the invention which employs fewer amplifiers than required in the embodiment of FIGURE 3.

FIGURE 6 is a schematic diagram of an embodiment of the invention for implementing an alternative method of performing the function of the invention.

FIGURE 7 is a schematic diagram of yet another embodiment of a filter constructed according to the invention.

FIGURE 8 is a schematic diagram of a modification of the invention for implementing yet another method of performing the function of the invention.

In order to facilitate exposition of the invention, its application and the analysis of shock spectra, of the type generated in the dynamic testing of structures, will be described hereinafter. Such use comprises the subject matter of copending patent application Ser. No. 382,493, filed July 14, 1964, now Patent No. 3,345,864 of common assignee herewith. It should be understood, however, that the application of the invention need not be confined to this particular use but can be applied to any spectral measurement requiring the use of a second-order filter. In this connection, it is useful to consider the differential equation involved in shock spectra analysis.

FIGURE 1 represents a base-excited, second-order vibration system. This system comprises a given mass, having a particular spring rate and damping constant, to which various input displacements may be applied, and from which various response displacements will follow. The differential equation for this system is given by:

$$M\ddot{X} + C(\dot{X} - \dot{U}) + K(X - U) = O \quad (1)$$

where:

U=input displacement ("U" can be a shock transient, a random or a steady-state motion)
X=response displacement
M=mass
C=spring rate
K=damping constant Let:

$$X - U = Z = \text{relative displacement}$$

Equation 1 reduces to:

$$-\frac{d^2 U}{dt^2} = \frac{d^2 Z}{dt^2} + \frac{\omega_n}{Q}\frac{dZ}{dt} + \omega_n^2 Z \quad (2)$$

or:

$$-\ddot{U} = \ddot{Z} + \frac{\omega_n}{Q}\dot{Z} + \omega_n Z \quad (3)$$

where:

$Q$=quality (or magnification) factor=$\sqrt{KM/C}$
$\omega_n$=$\sqrt{K/M}$=natural frequency.

It can also be shown that $$1/Q = \Delta\omega/\omega_n \quad (4)$$

where $\Delta\omega$ is the bandwidth of the system response. Therefore, if Q is to remain constant (a common analysis requirement) as $\omega_n$ is varied, the system must maintain a constant percentage bandwidth ($\Delta\omega/\Delta_n$) with changing frequency. The invention provides an arrangement of electrical components that constitute an analog of the system described above and which allows $\omega_n$ to be varied while maintaining a constant Q.

A typical analog computer network for simulating the second-order base-excited system of FIGURE 1 is shown in FIGURE 2. Subsystems 1 through 7 consist of electronic operational amplifiers with appropriate input and feedback impedances. The input impedance to operational amplifier 7 comprises fixed resistors 10 and 16. The input impedances to amplifiers 1 and 2 comprise potentiometers 8 and 9, respectively. The input impedances to amplifiers 3 and 4 comprise potentiometers 11 and 14, respectively. The input impedance to amplifier 5 comprises fixed resistor 12. The input impedance to amplifier 6 comprises fixed resistors 13 and 15. Amplifiers 7, 5, and 6 are provided with fixed feedback resistors 17, 21, and 23, respectively. Amplifiers 1 and 2 are provided with feedback impedances comprising capacitors 18 and 19, respectively. Amplifiers 3 and 4 are provided with adjustable feedback impedances comprising variable resistors 20 and 22, respectively. The input signal, corresponding to $\ddot{U}$ (input acceleration), is applied to terminal 24.

It should be understood that the term "impedance" as used throughout this specification, and in the claims, is intended to include pure resistance, and/or capacitance, and/or the forward transfer function of an operational amplifier, as well as means for providing these electrical properties.

The spectrum of the input signal at terminal 24 is measured by applying it to the system while slowly varying the natural frequency (maintaining Q at a constant value) and observing the output, $\ddot{X}$, of amplifier 6 on an oscilloscope or peak reading voltmeter. Spectral values can be plotted against frequency by employing an X–Y plotter, in which displacement along the X axis is proportional to $\omega_n$.

To facilitate mathematical treatment of the circuit of FIGURE 2, resistors 8, 9, 11, and 14 correspond to resistances $R_1$, $R_2$, $R_3$, and $R_4$, respectively, in the equations that follow. Similarly, capacitors 18 and 19 are represented by $C_1$ and $C_2$, respectively. In the circuit of FIGURE 2, as in the embodiment of FIGURE 3, the ratio of output voltage ($E_o$) to input voltage ($E_i$) for a given operational amplifier is given by:

$$\frac{E_o}{E_i} = \frac{\text{feedback impedance}}{\text{input impedance}} \quad (5)$$

The ratios of feedback to input impedances for amplifiers 1, 2, 3, and 4 are represented by $A_1/p$, $A_2/p$, $A_3$ and $A_4$, respectively, where the operator, $$\frac{1}{p} = \frac{1}{j\omega}$$

(where $j=\sqrt{-1}$) arises from the integrations performed by amplifiers 1 and 2. It follows from FIGURE 2 then, that:

$$\frac{\omega_n}{Q}\dot{Z} = \frac{A_1}{p}A_3\ddot{Z} \quad (6)$$

and $$\omega_n^2 Z = \frac{A_1}{p}\frac{A_2}{p}A_4\ddot{Z} \quad (7)$$

Therefore:

$$\omega_n/Q = A_1 A_3 \quad (8)$$

and $$\omega_n^2 = A_1 A_2 A_4 \quad (9)$$

The essence of the method aspect of the invention is contained in Equations 8 and 9 which indicates that a change in any of the impedance ratios $A_1$, $A_2$ or $A_4$ will change the natural frequency $\omega_n$ and a change in either $A_1$ or $A_3$ will result in a change in the ratio of natural frequency to the Q of the system. By eliminating $\omega_n$ from Equations 8 and 9 it becomes possible to establish conditions which will cause Q to remain constant as $\omega_n$ is varied.

Thus, squaring Equation 8:

$$\omega_n^2/Q^2 = A_1^2 A_3^2 \quad (10)$$

and rewriting, $$\omega_n^2 = Q^2 A_1^2 A_3^2 = A_1 A_2 A_4 \quad (11)$$

Therefore:

$$Q^2 A_1 A_3^2 = A_2 A_4 \quad (12)$$

or, $$Q^2 = A_2 A_4 / A_1 A_3^2 \quad (13)$$

It can be seen from Equation 13 that Q will remain constant if any of the following conditions hold:

(a) $A_2$ and $A_3$ are held constant and $A_1$ is varied in direct proportion to $A_4$, or $A_4/A_1$=constant.

(b) $A_4$ and $A_3$ are held constant and $A_2$ is varied in direct proportion to $A_1$.

(c) $A_2$ and $A_1$ are held constant and $A_4$ is varied in proportion to $A_3^2$.

(d) $(A_2 A_4)$ is varied in proportion to $(A_1 A_3^2)$.

In practice any of the aforementioned conditions required to maintain a constant Q as $\omega_n$ is varied can be achieved by ganging the appropriate feedback and/or input impedances. For instance, method (a) could involve the utilization of ganged potentiometers for the input impedances 8 and 14. Similarly, method (b) could involve ganging variable resistors 8 and 9. Method (c) would require the addition of another amplifier (with resistive impedances) in series with amplifier 4. The required performance would be realized by ganging the input (or feedback) impedances of the additional amplifier and amplifiers 3 and 4. Exemplary circuits to implement each of these methods of performing the novel function of the invention will be described hereinafter.

There is shown in FIGURE 3 a circuit arrangement encompassing two ways of achieving method (c). Subsystems 31–38 consist of operational amplifiers with appropriate input and feedback impedances. The input signal Ü corresponding to input acceleration, is applied to terminal 25. The input impedances to amplifier 31 comprises fixed resistors 39 and 41. The input impedances to amplifiers 32, 33, 34, 35, and 36 comprise variable resistors 42–46, respectively. The input impedance to amplifier 37 comprises fixed resistors 47 and 48. The input impedance to amplifier 38 comprises input resistor 49. The feedback impedance around amplifiers 31, 37, and 38 comprise fixed resistors 51–53, respectively. The feedback impedance around amplifier 32 may be varied by selectively inserting capacitors 54–56 into the feedback loop by means of selector switch 57. Similarly, the feedback impedance around amplifier 33 may be selectively varied by switching capacitors 61–63 into the feedback loop by means of selector switch 58.

The feedback impedance around amplifiers 34–36 comprise variable resistors 64–66, respectively, which may be ganged for simultaneous adjustment via shaft 59, as will appear hereinafter.

The output of amplifier 37, which carries a signal Ẍ corresponding to the response acceleration appears on line 68. In its intended use, the output on line 68 is supplied to the inputs of cathode ray oscilloscope 69 and a peak-reading voltmeter 70. Other utilization devices could, of course, be connected to line 68.

By keying the linear feedback potentiometers 64, 65, and 66 to a common shaft 59 the gain across the two amplifiers in series will be proportional to $A_3^2$. A similar effect would be obtained by keying the input potentiometers 44–46 together. A third variation involves keying all input potentiometers 44–46 to one shaft 67 and all feedback potentiometers 64–66 to a second shaft 59. The natural frequency could then be increased by increasing all feedback resistances while decreasing input resistances. The required gain relationship would exist independently of shaft speed differences or variations.

The spectrum of the input signal at terminal 25 is measured by applying it to the system while slowly varying the natural frequency and observing the output on oscilloscope 69. Spectral values can be plotted against frequency by employing an XY plotter, in which displacement along the X axis is proportional to $\omega_n$, in conjunction with a peak voltage reading device, such as voltmeter 70.

As was mentioned hereinabove, the method is not confined to shock spectra determination. It can in fact be applied to any spectral measurement problem requiring a second order filter.

While the above-described apparatus will perform the intended function of the invention in accordance with method (c), it is by no means the best way of implementing the invention.

The implementation of methods (a) and (b) represent the preferred approach since they require a smaller number of amplifiers. It is possible to construct a filter that employs only five amplifiers.

An embodiment is presented in FIGURE 5 which shows an arrangement encompassed by the method (b). Amplifiers 71, 72, and 73 perform functions analogous to amplifiers 1, 2, and 3, respectively, in FIGURE 2, with amplifier 72 also performing the functions of both amplifiers 2 and 4 of FIGURE 2.

Some of the operational amplifier functions that have been described previously in FIGURE 2 can be equally well accomplished by the use of potentiometers. Potentiometers can be substituted to perform the operations $A_3$ (amplifier 3) and $A_4$ (amplifier 4) for instance, if additional circuit modifications are introduced to assure that the pertinent voltages have the correct polarity. The four conditions for maintaining Q constant still apply. Such modifications will be described in connection with FIGURES 5–8.

FIGURE 4 graphically represents the forward transfer function of a typical damped shock-spectrum filter constructed in accordance with the present invention. The relative gain of the filter, in decibels, is plotted along the axis of the ordinate. Frequency in cycles per second is plotted along the axis of the abscissa. The curve representing the transfer function has the distinctive characteristic of shock spectra filters and is readily distinguishable from the transfer function of constant bandwidth, continuous-frequency filters of the prior art.

The embodiment of the invention shown in FIGURE 5 implements method (b) of the invention, and comprises subsystems 71–75. Amplifiers 71 and 72 comprise integrators having feedback capacitors 81 and 82. The input impedance for amplifiers 71 and 72 comprises potentiometers 83 and 84, respectively. The output of amplifier 73 is supplied to amplifier 74 via fixed resistance 85. The input signal Ü to amplifier 74 is supplied via resistance 86. The output of integrator amplifier 71 is applied to sign-changing amplifier 73 via potentiometer 87. The gain of amplifier 73 is set by potentiometer 88. The output of amplifier 72 and sign-changing amplifier 73 are summed in the network comprising resistors 85 and 89 and applied to the input of amplifier 74. Amplifier 74 is provided with feedback resistor 91.

The output of amplifier 74 is supplied through resistor 92 to the input of amplifier 75 where it is added to the input signal Ü supplied via resistor 83.

Output summing amplifier 75, which has its input supplied from the network comprising resistors 92 and 93, is provided with feedback resistor 94. The output signal $-\ddot{X}$ appears at output terminal 95.

To facilitate correlation of the circuit arrangement of FIGURE 5 with the mathematical treatment of the various methods of implementing the invention, it should be noted that capacitors 81 and 82 correspond to capacitance $C_1$ and $C_2$, respectively. Similarly, resistors 83 and 84 are represented by $R_1$ and $R_2$, respectively. The apparatus shown in FIGURE 5 will maintain Q constant in accordance with method (b) referred to hereinabove. This same method may be implemented by the apparatus of FIGURE 5 by ganging the following impedances (the first combination of which is illustrated by the dotted line 96 in FIGURE 5):

$R_1$ and $R_2$
$R_1$ and $C_2$
$C_1$ and $C_2$
$C_1$ and $R_2$

There is shown in FIGURE 6 an embodiment of the invention which operates in accordance with method (a) described hereinabove. This circuit arrangement comprises subsystems 101–105 wherein operational amplifiers 101, 102, and 103 perform analagous functions to amplifiers 1, 2, and 3 of FIGURE 2 or amplifiers 71, 72, and 73 of FIGURE 5, respectively. Amplifiers 101 and 102 are provided with integrating capacitors 106 and 107, respectively. Resistances 108, 109, and 110 comprise the feedback resistances for amplifiers 103, 104, and 105, respectively.

Amplifiers 101 and 102 comprise integrators having potentiometers 111 and 112, respectively, as input impedances. The input signal Ü, appearing at terminal 113, is supplied via input impedance 114 to amplifier 104. The output of amplifier 101 is supplied through variable input impedance 115 to amplifier 103; the output of amplifier 103 is supplied to potentiometer 116. Potentiometers 116 and 117 comprise a summing network, the output of which is added to the input of the signal obtained via resistor 114. The output from amplifier 104 is combined in a summing network comprising resistors 118 and 119 to provide an input signal to amplifier 105. The output of amplifier 105 comprises the signal $-\ddot{X}$ appearing on output terminal 120.

The Q of the filter shown in FIGURE 6 can be adjusted by varying any one or all of the impedances 112, 115, or 116. Combinations of ganged impedances to perform the method (a) of the invention may comprise $R_4$ and $R_1$, shown in FIGURE 6 as potentiometers 117 and 111, respectively, or by ganging $R_4$ which corresponds to potentiometer 117, and $C_1$ which corresponds to capacitor 106. Impedance 117 could be replaced by an operational amplifier together with an appropriate sign changer.

There is shown in FIGURE 7 an alternative apparatus for implementing method (c) of the invention. This embodiment comprises subsystems 121–127. Amplifiers 121 and 122 comprise integrators having feedback capacitances 128 and 129, respectively. Amplifiers 126 and 127 are provided with feedback resistances 131 and 132, respectively. The input impedances for amplifiers 121 and 122 comprise potentiometers 133 and 134, respectively. The input signal Ü appears at terminal 135 and is applied via input impedance 136 to amplifier 126.

The input signal at terminal 135 and the output signal from amplifier 126 are summed via the network comprising resistors 137 and 138 and supplied to the input of amplifier 127.

Subsystem 123 comprises a variable resistance and subsystem 124 comprises a pair of linear potentiometers which are ganged and connected in series. If desired, subsystem 124 may comprise a single non-linear potentiometer whose resistance varies as the square of the angle of rotation. The output of amplifier 122 is supplied to subsystem 124 and the output sign-changer 125 is supplied to the subsystem comprising variable resistance 123. The signals from subsystems 123 and 124 are summed and supplied to the input of amplifier 126.

As was mentioned hereinabove, the apparatus of FIGURE 7 performs method (c) of the invention and provides the output signal $-\ddot{X}$ at output terminal 139.

There is shown in FIGURE 8 another circuit arrangement for implementing method (c) of the invention. This circuit arrangement comprises subsystems 141–146. Amplifiers 141 and 142 are provided with integrating capacitors 147 and 148, respectively. The input signal Ü applied to terminal 150 is supplied via input impedance 149 to amplifier 145. The output of amplifier 145 is applied via input impedance 151 to amplifier 141. The output of amplifier 141 is supplied to amplifier 142 via input impedance 140 and also to amplifier 143 via variable impedance 152. The gain of amplifier 143 is controlled by means of potentiometer 153. The output of amplifier 143 is combined with the output of amplifier 142 in the summing network comprising impedances 144 and 154. Impedance 144 consists of two linear ganged potentiometers or, if desired, a single non-linear potentiometer whose resistance varies as the square of the angle of rotation. The gang connection of impedances 144 and 145 is indicated at 161.

Amplifier 145 is provided with feedback resistance 155 and has its output supplied to a summing network comprising resistors 156 and 157. The summed output of this network is supplied to output amplifier 146, having feedback resistance 158. The output signal $-\ddot{X}$ is obtained from terminal 159.

This circuit may be modified by ganging impedance 144 with potentiometer 152 or potentiometer 153. The optional ganged connection between impedance 144 and potentiometer 152 is indicated at 162. The optional ganged connection between impedance 144 and potentiometer 153 is indicated at 163. The circuit arrangement of FIGURE 8 performs the same method as the apparatus of FIGURE 3. However, in the arrangement of FIGURE 8, potentiometers 144 have been substituted for operational amplifiers 34 and 35 of FIGURE 3. In the arrangement of FIGURE 8, amplifier 143 performs both a sign changing function as well as the multiplying function of potentiometer 123 of FIGURE 7.

It should be understood that Q may be adjusted to any desired value by suitably varying the input and/or feedback impedances of one or more of those subsystems which have not been ganged for varying the frequency. In general, it is preferred that subsystem 3 (operational amplifier 3 in FIGURE 2) or its equivalent in FIGURES 5–8 have its input or feedback impedance varied to adjust Q. In particular, for methods (a) and (b) by varying subsystem 3, rather than one or more of the other subsystems, the value for $\omega_n$ in Equation 11 will remain unchanged. If desired, the impedances of more than one subsystem may be ganged to adjust Q. For example, feedback capacitors 147 and 148 in the embodiment of FIGURE 8 may be made variable.

As can be seen from the foregoing description of FIGURES 3, 5–8, the invention may be implemented in a number of ways. Furthermore, the method is not confined to shock spectra determination. It can, in fact, be applied to any spectral measurement problem requiring a second order filter.

It will be apparent to those versed in the art that certain changes may be made in the arrangement of the analog computing elements and their co-action as described above, without departing from the scope of the invention herein involved. It is, therefore, intended that all material contained in this specification or shown in the accompanying drawings shall not be interpreted in a limiting sense.

What is claimed is:

1. An electrical filter network having signal transmission characteristics, from input to output, in which the Q (quality factor) of the filter remains constant as the natural frequency of the filter is continuously varied, comprising:

first, second, third, and fourth signal transmission means;
   a plurality of signal feedback means connected to corresponding ones of said signal transmission means whereby each of said signal transmission means has a given ratio of feedback impedance to input impedance;
   circuit means interconnecting said first and third signal transmission means so that the product of their said impedance ratios equals the natural frequency of said filter network divided by the Q of said network; and
   means interconnecting said first, second and fourth signal transmission means so that the product of their said impedance ratios equals the square of the natural frequency of said network.

2. An electrical filter network as defined in claim 1 including:
   means for maintaining the feedback impedance to input impedance ratio values of said second and said third signal transmission means constant; and
   means for simultaneously varying the feedback impedance to input impedance ratio value of said first signal transmission means in direct proportion to the feedback impedance to input impedance ratio value of said fourth signal transmission means.

3. An electrical filter network as defined in claim 1 including:
   means for maintaining the feedback impedance to input impedance ratio value of said fourth and said third signal transmission means constant; and means for varying the feedback impedance to input impedance ratio value of said second signal transmission means in direct proportion to the feedback impedance to input impedance ratio value of said first signal transmission means.

4. An electrical filter as defined in claim 1 including:
   means for maintaining the ratios of feedback impedance to input impedance of each of said first and said second signal transmission means constant; and
means for varying the value of the ratio of the feedback impedance to input impedance of said fourth signal transmission means in proportion to the squared value of the ratio of feedback impedance to input impedance of said third signal transmission means.

5. In a filter network having an input terminal and an output terminal, the transmission characteristics of which, from said input terminal to said output terminal, are represented by the equation $$Q^2 = A_2 A_4 / A_1 A_3^2$$

where Q equals quality factor, and $A_1$, $A_2$, $A_3$, and $A_4$ each represent ratios of feedback-to-input impedances of corresponding ones of four operational amplifiers placed in a signal transmission channel between said input terminal and said output terminals:
a plurality of selectively adjustable means for varying the impedance ratios of corresponding ones of at least two of said operational amplifiers; and
means for simultaneously adjusting said plurality of adjusting means to maintain a constant value of Q for said network.

6. An electrical network for simulating a second-order, base-excited vibration system comprising:
first integrator means having an input, for receiving an input acceleration signal, and producing an output velocity signal;
means for multiplying said velocity signal by a constant;
second integrator means responsive to said velocity signal for producing a displacement signal;
means for multiplying said displacement signal by a constant;
a summing circuit for combining said multiplied velocity and displacement signals to produce a response acceleration signal; and
means for adjusting one of said signal multiplying means as a function of the other so as to maintain a fixed ratio of the time constants of said first and second integrator means.

7. A network as defined in claim 6 wherein said adjusting means simultaneously varies both of said signal multiplying means.

8. A constant-Q, continuous frequency electrical filter comprising:
a first operational amplifier means having an input terminal for receiving the input signal to said filter, and having an output terminal;
a first integrator means, having a selectively variable input impedance, connected to said output terminal of said first operational amplifier means;
a second integrator means, having a selectively variable input impedance, connected in series with said first integrator means;
means for simultaneously varying the input impedance of said first and second integrator means;
sign-changing amplifier means having its input connected to the output of said first integrator means;
a first impedance having one terminus connected to the output of said sign-changing amplifier means;
a second impedance having one terminus connected to the output of said second integrator means;
means connecting the other terminus of each of said first and said second impedances to said input terminal of said first operational amplifier means;
a second operational amplifier means;
a summing network having two inputs one of which is connected to said input terminal and the other of which is connected to said output terminal of said first operational amplifier means; and
an output amplifier means connected to the output of said summing network, and from which the output of said filter is obtained.

9. An electrical filter comprising:
a first operational amplifier means having an input terminal for receiving the input signal to said filter, and having an output terminal;
a first integrator means connected to said output terminal of said first operational amplifier means;
a second integrator means connected in series with said first integrator means;
signal sign-changing means connected to the output of said first integrator means;
a first variable impedance connected to the output of said sign-changing means;
a second variable impedance connected to the output of said second integrator means;
means for summing the output of said first and said second variable impedances and for supplying the summed signal therefrom to said input terminal of said first operational amplifier means;
a second operational amplifier means;
a summing network having two inputs, one of which is connected to said input terminal and the other of which is connected to said output terminal of said first operational amplifier means; and
an output amplifier means connected to the output of said summing network, and from which the output of said filter is obtained.

10. An electrical filter as defined in claim 9 including means for simultaneously varying said first and second variable impedance to change the natural frequency of said filter.

11. An electrical filter as defined in claim 10 including means for simultaneously varying the gain of said signal sign-changing means with said simultaneous varying means.

12. A constant-Q, continuous frequency electrical filter comprising:
a first operational amplifier means having an input terminal for receiving the input signal to said filter and an output;
a first integrator means connected in series with the output of said first operational amplifier means;
a second integrator means connected in series with said first integrator means;
first and second series-connected feedback amplifiers connected to the output of said second integrator means;
a third feedback amplifier connected to the output of said first integrator means;
a second operational amplifier means;
a summing network one input of which is connected to the output of said third feedback amplifier and the other input of which is connected to the output of said first and second feedback amplifiers;
a third operational amplifier means having its input connected to the output of said summing network and its output connected to said input terminal; and
an output terminal connected to the output of said second operational amplifier means for supplying the output signal from said filter.

13. An electrical filter as defined in claim 12 including:
means for simultaneously varying the gain of said first, second, and third feedback amplifiers.

14. An electrical filter as defined in claim 12 wherein each of said feedback amplifiers is provided with separate input and feedback impedances.

15. An electrical filter as defined in claim 14 including:
means for simultaneously varying the input impedance of said first, second, and third feedback amplifiers.

16. An electrical filter as defined in claim 14 having:
gain varying means comprising means for simultaneously changing the feedback impedances of each of said feedback amplifiers.

17. An electrical filter as defined in claim 14 having: gain varying means comprising means for simultaneously varying said input and feedback impedances.

References Cited

UNITED STATES PATENTS

| | | | |
|---|---|---|---|
| 2,917,626 | 12/1959 | Usher | 328—127 |
| 3,127,565 | 3/1964 | Williams | 328—127 |
| 3,159,741 | 12/1964 | Dahlin | 235—183 |
| 3,167,718 | 1/1965 | Davis et al. | 328—127 |

ARTHUR GAUSS, *Primary Examiner.*

B. P. DAVIS, *Assistant Examiner.*

U.S. Cl. X.R.

235—183